United States Patent [19]

Sakamoto et al.

[11] Patent Number: 5,691,254

[45] Date of Patent: Nov. 25, 1997

[54] ENAMEL FRIT COMPOSITION FOR A LOW-EXPANSION CRYSTALLIZED GLASS AND ENAMEL-COATED LOW-EXPANSION CRYSTALLIZED GLASS PLATE USING THE SAME

[76] Inventors: Akihiko Sakamoto; Kiyoshi Katagi; Masayuki Ninomiya, all of c/o Nippon Electric Glass Co., Ltd., 7-1, Seiran 2-chome, Otsu-shi, Shiga-ken, Japan

[21] Appl. No.: 757,065

[22] Filed: Nov. 26, 1996

[30] Foreign Application Priority Data

Nov. 30, 1995 [JP] Japan .................. 7-337742
Feb. 27, 1996 [JP] Japan .................. 8-067289

[51] Int. Cl.$^6$ .................. C03C 8/00; C03C 8/06; C03C 8/14
[52] U.S. Cl. .................. 501/17; 501/21; 501/25; 501/32; 501/59; 501/66; 501/69; 501/63; 501/72; 501/71; 501/4; 428/427; 428/428; 428/426; 428/699; 428/701
[58] Field of Search .................. 501/17, 21, 25, 501/14, 59, 18, 32, 66, 69, 72, 71, 63, 4; 428/427, 428; 427/426, 699, 701

[56] References Cited

U.S. PATENT DOCUMENTS

| | | | |
|---|---|---|---|
| 4,377,404 | 3/1983 | Hoshikawa | 501/66 |
| 4,835,121 | 5/1989 | Shibuya et al. | 501/4 |
| 5,091,345 | 2/1992 | Becker | 510/17 |
| 5,262,363 | 11/1993 | Yoshida et al. | 501/17 |
| 5,308,803 | 5/1994 | Clifford et al. | 501/17 |
| 5,326,728 | 7/1994 | Boury et al. | 501/17 |
| 5,393,714 | 2/1995 | Thometzek et al. | 501/17 |

FOREIGN PATENT DOCUMENTS

| | | |
|---|---|---|
| 60-21830 | 2/1985 | Japan . |
| 7-61837 | 3/1995 | Japan . |

*Primary Examiner*—Micheal Marcheschi
*Attorney, Agent, or Firm*—Hopgood, Calimafde, Kalil & Judlowe

[57] ABSTRACT

In order to provide an enamel frit composition for a low-expansion crystallized glass, capable of producing an enamel coating excellent in abrasion resistance and acid resistance without occurrence of cracks by using glass powder which does not contain any harmful component such as PbO, and to provide an enamel-coated low-expansion crystallized glass plate using the enamel frit composition, the enamel frit composition for a low-expansion crystallized glass essentially consists 40–98 wt % glass powder, 1–55 wt % coloring pigment, and 0–54 wt % filler. The glass powder consists, by weight, of 55–72% $SiO_2$, 4–8% $Al_2O_3$, 14–22% $B_2O_3$, 2–4% BaO, 5.1–15% $Na_2O$, 0–2% $Li_2O$, 0–2.8% $K_2O$, and 0–2% $F_2$.

5 Claims, No Drawings

ENAMEL FRIT COMPOSITION FOR A LOW-EXPANSION CRYSTALLIZED GLASS AND ENAMEL-COATED LOW-EXPANSION CRYSTALLIZED GLASS PLATE USING THE SAME

BACKGROUND OF THE INVENTION

This invention relates to a low-expansion crystallized glass plate and, in particular, to a low-expansion crystallized glass plate for use as a top plate of an electric cooker or an electromagnetic cooker with a heat source such as a halogen heater.

This invention also relates to an enamel frit composition for the above-mentioned low-expansion crystallized glass plate.

Recently, there is an increasing demand for an electric cooker and an electromagnetic cooker because of their safety. As a top plate of the electric or the electromagnetic cooker, proposal is made of an infrared-transparent crystallized glass (see U.S. Pat. No. 4,835,121). Use is also made of a low-expansion crystallized glass plate having a coefficient of thermal expansion of about −5 to $30 \times 10^{-7}$/°C. within a temperature range between 30° and 750° C.

In order to paint a surface of the low-expansion crystallized glass plate of the type described, use has widely been made of an enamel frit composition which comprises glass powder typically used as an enamel for a ceramic article, and a coloring pigment. An enamel coating is produced from the enamel frit composition by mixing the glass powder and the coloring pigment to form a paste, applying the paste on the surface of the crystallized glass plate by screen printing, and baking the paste at a predetermined temperature.

It is required for the enamel coating formed on the crystallized glass plate for use as the top plate of the cooker of the type described not to contain any component harmful to human body, to hardly cause cracks, and to be excellent in abrasion resistance and acid resistance.

No conventional enamel frit composition, however, can produce the enamel coating satisfying all of the above-mentioned requirements. For example, several known enamel frit compositions can produce the enamel coating hard to cause cracks and excellent in abrasion resistance and acid resistance but contain harmful PbO as a component of the glass powder. On the other hand, proposal is made of harmless enamel frit compositions using borosilicate glass powder without PbO. However, the enamel frit compositions of this type are disadvantageous in that the resultant coating is insufficient in abrasion resistance.

For example, one of the enamel frit compositions without any harmful component such as PbO is disclosed in Japanese Unexamined Patent Publication No. 7-61837 (JP-A-07061837). This composition essentially consists of 55–95 wt % glass powder, 0.1–20 wt % refractory filler, and 3–25 wt % heat resistant pigment. The glass powder consists, by weight, of 50–75% $SiO_2$, 0.5–15% $Al_2O_3$, 5–30% $B_2O_3$, 0–7% BaO, 0–2% $Li_2O_3$, 0–5% $Na_2O$, 0–4% $K_2O$, and 0–2% $F_2$. The refractory filler comprises at least one of zirconium and zirconia.

However, the enamel coating produced from the above-mentioned enamel frit composition is still insufficient in abrasion resistance.

SUMMARY OF THE INVENTION

It is an object of the present invention to provide an enamel frit composition for a low-expansion crystallized glass, which comprises glass powder containing no harmful component such as PbO and which is capable of producing an enamel coating free from cracks and excellent in abrasion resistance and acid resistance.

It is another object of the present invention to provide an enamel-coated low-expansion crystallized glass plate using the above-mentioned enamel frit composition for a low-expansion crystallized glass.

According to an aspect of the present invention, there is provided an enamel frit composition for a low-expansion crystallized glass, essentially consisting of 40–98 wt % glass powder, 1–55 wt % coloring pigment, and 0–54 wt % filler. The glass powder consists, by weight, of 55–72% $SiO_2$, 4–8% $Al_2O_3$, 14–22% $B_2O_3$, 2–4% BaO, 5.1–15% $Na_2O$, 0–2% $Li_2O$, 0–2.8% $K_2O$, and 0–2% $F_2$.

According to another aspect of the present invention, there is provided an enamel-coated low-expansion crystallized glass plate comprising a low-expansion crystallized glass plate covered with an enamel coating which essentially consists of 40–98 wt % glass component, 1–55 wt % coloring pigment, and 0–54 wt % filler. The glass component consists, by weight, of 55–72% $Si_2$, 4–8% $Al_2O_3$, 14–22% $B_2O_3$, 2–4% BaO, 5.1–15% $Na_2O$, 0–2% $Li_2O$, 0–2.8% $K_2O$, and 0–2% $F_2$.

DESCRIPTION OF PREFERRED EMBODIMENT

Prior to description of embodiments, the reason why the above-mentioned composition of glass powder used in the present invention is determined will be mentioned for each component.

The content of $SiO_2$ is 55–72%, preferably, 60–65%. When the content of $SiO_2$ is less than 55%, acid resistance of the glass is degraded. In addition, the coefficient of thermal expansion is increased so that a too much difference in expansion is produced between an enamel coating and a low-expansion crystallized glass plate. In this event, the enamel coating is susceptible to frequent occurrence of cracks. With the content more that 72%, the flowability of the glass is decreased and the sinterability is reduced. As a result, the abrasion resistance of the enamel coating is degraded.

The content of $Al_2O_3$ is 4–8%, preferably, 5–7%. When the content of $Al_2O_3$ is less than 4% or more than 8%, the flowability of the glass is deteriorated.

The content of $B_2O_3$ is 14–22%, preferably, 16–20%. When the content of $B_2O_3$ is less than 14%, the flowability of the glass is deteriorated. With the content more than 22%, the coefficient of thermal expansion is excessively high.

The content of BaO is 2–4%, preferably, 2.5–3.5%. When BaO is less than 2%, the flowability of the glass is deteriorated. With the content more than 4%, the coefficient of thermal expansion is excessively high.

$Na_2O$ is an essential component to produce the enamel coating excellent in abrasion resistance. When $Na_2O$ is contained in borosilicate glass having the above-mentioned composition, the glass is greatly improved in flowability and is firmly sintered. Accordingly, the enamel coating having sufficient abrasion resistance can be obtained. The content of $Na_2O$ is 5.1–15%, preferably, 5.4–10%. When content of $Na_2O$ is less than 5.1%, the above-mentioned effect cannot be obtained. On the other hand, when the content of $Na_2O$ is more than 15%, acid resistance is greatly decreased and the coefficient of thermal expansion tends to be increased.

The content of $Li_2O$ is 0–2%, preferably, 0.1–1.5%. When the content of $Li_2O$ is more than 2%, the acid resistance is greatly decreased and the coefficient of thermal expansion tends to be increased.

The content of $K_2O$ is 0–2.8%, preferably, 0–2.3%. When the content of $K_2O$ is more than 2.8%, the acid resistance is greatly decreased and the coefficient of thermal expansion tends to be increased.

The content of $F_2$ is 0–2%, preferably, 0–1.5%. When $F_2$ is more than 2%, the flowability is changeable. It is therefore difficult to obtain the stable enamel coating.

The glass powder having the above-mentioned composition does not contain any harmful component such as PbO, is flowable at a low temperature, has low coefficient of thermal expansion, and is excellent in abrasion resistance and acid resistance.

As the coloring pigment in the present invention, use can be made of commercially-available pigments, for example, color oxides such as NiO (green), $MnO_2$ (black), CoO (black), $Fe_2O_3$ (dark brown), $Cr_2O_3$ (green), and $TiO_2$ (white), oxides such as Cr—Al spinnel (pink), Sn—Sb—V rutile (gray), Ti—Sb—Ni rutile (yellow), and Zr—V baddeleyite (yellow), composite oxides such as Co—Zn—Al spinnel (blue) and Zn—Fe—Cr spinnel (brown), and silicates such as Ca—Cr—Si garnet (victoria green), Ca—Sn—Si—Cr sphene (pink), Zr—Si—Fe zirconium (salmon pink), Co—Zn—Si willemite (dark blue), and Co—Si olivine (dark blue).

In the present invention, a filler can be mixed up to 54 wt % in order to further improve the abrasion resistance. As the filler, it is preferred to use at least one of zirconium and zirconia.

The above-mentioned mixing ratio of the glass powder, the coloring pigment, and the filler in the enamel frit composition of the present invention is determined for the reason which will hereafter be described.

When the content of the glass powder is less than 40 wt %, the flowability is decreased and the abrasion resistance is reduced. On the other hand, with the content more than 98 wt %, the flowability is excessively high so that a desired painting pattern is difficult to obtain. When the content of the coloring pigment is less than 1 wt %, it is difficult to obtain a desired hue. With the content more than 55 wt %, the flowability is decreased. Furthermore, when the content of the filler is more than 54 wt %, the flowability is also decreased.

The enamel frit composition described above has a coefficient of thermal expansion of about $20–70\times10^{-7}$/°C. within a temperature range between 30° and 380° C. The enamel coating can be formed from the enamel frit composition by heat treatment at a temperature not higher than about 900° C.

Next, description will be made as regards a method of forming the enamel coating on the low-expansion crystallized glass plate by use of the enamel frit composition according to the present invention.

At first, the glass powder, the coloring pigment, and the filler are mixed in the above-mentioned ratio to form the mixture. On the other hand, a vehicle is prepared by dissolving a resin such as ethyl cellulose, nitrocellulose, and acrylic resin in a solvent such as terpineol and butyl carbitol acetate. Next, the above-mentioned mixture and the vehicle are mixed in a desired ratio and kneaded by a three-roll mill or a ball mill to form a paste.

A low-expansion crystallized glass plate or a low-expansion crystallizable glass plate is prepared. As the low-expansion crystallized glass plate, those having the coefficient of thermal expansion of about $-5$ to $30\times10^{-7}$/°C. within a temperature range of 30° and 750° C. can be used. For example, use is preferably made of a crystallized glass which consists, by weight, of 60–75% $SiO_2$, 15–25% $Al_2O_3$, 2.5–5% $Li_2O$, 0–3% MgO, 0–3% ZnO, 0–3% BaO, 1–7% $TiO_2$, 0–3% $ZrO_2$, 0–3% $P_2O_5$, 0–2% $Na_2O$, 0–1% $K_2O$, 0–0.5% $V_2O_5$, 0–0.5% $Fe_2O_3$, 0–0.5% NiO, and 0–0.2% CoO, and contains precipitated solid solution crystals of β-quartz. This is because the above-mentioned crystallized glass is excellent in shock resistance and strength. As the low-expansion crystallizable glass, a raw glass for the crystallized glass can be used.

Next, the above-mentioned paste is applied onto the surface of the low-expansion crystallized glass plate or the low-expansion crystallizable glass plate by screen printing or the like. It is essential to apply the paste so that the thickness of the enamel coating finally obtained falls within a range between 0.2 and 20 μm. Specifically, when the thickness of the enamel coating is less than 0.2 μm, the abrasion resistance is insufficient. On the other hand, when the thickness is more than 20 μm, the enamel coating is susceptible to frequent occurrence of cracks.

Thereafter, baking is carried out at a temperature range between 800° and 900° C. to obtain the low-expansion crystallized glass plate coated with the enamel coating comprising 40–98 wt % glass component, 1–55 wt % coloring pigment, and 0–54 wt % filler, where the glass component consists, by weight, of 55–72% $SiO_2$, 4–8% $Al_2O_3$, 14–22% $B_2O_3$, 2–4% BaO, 5.1–15% $Na_2O$, 0–2% $Li_2O$, 0–2.8% $K_2O$, and 0–2% $F_2$.

Now, the detailed description will be made as regards a specific example of the present invention.

Tables 1–4 show samples Nos. 1–21 according to the present invention and comparative samples Nos. 22–24.

TABLE 1

| | | Sample No. Present Invention | | | | | |
|---|---|---|---|---|---|---|---|
| | | 1 | 2 | 3 | 4 | 5 | 6 |
| Glass Powder Composition (wt %) | $SiO_2$ | 63.0 | 63.0 | 61.2 | 67.9 | 61.8 | 57.0 |
| | $Al_2O_3$ | 7.0 | 5.0 | 5.0 | 6.5 | 6.5 | 6.5 |
| | $B_2O_3$ | 18.0 | 19.0 | 19.0 | 16.0 | 16.0 | 20.0 |
| | BaO | 2.5 | 3.0 | 3.0 | 2.5 | 3.5 | 3.5 |
| | $Na_2O$ | 7.5 | 8.5 | 8.5 | 5.5 | 10.0 | 12.5 |
| | $Li_2O$ | 0.5 | 0.5 | 0.5 | — | 0.7 | 0.3 |
| | $K_2O$ | 1.0 | 0.5 | 2.3 | 1.0 | 1.5 | — |
| | $F_2$ | 0.5 | 0.5 | 0.5 | 0.6 | — | 0.2 |
| Mixing Ratio (wt %) | Glass Powder | 95 | 80 | 65 | 95 | 90 | 80 |
| | Yellow Pigment | — | — | — | — | — | — |
| | Brown Pigment | — | — | — | — | — | — |
| | White Pigment | 5 | 20 | 30 | 5 | 10 | 10 |
| | $ZrSiO_4$ Powder | — | — | 5 | — | — | 10 |
| | $ZrO_2$ Powder | — | — | — | — | — | — |
| Coefficient of Thermal Expansion of Enamel Coating ($\times10^{-7}$/°C.) | | 45 | 46 | 52 | 38 | 51 | 60 |
| Cracks | | none | none | none | none | none | none |
| Abrasion Resistance | | good | good | good | good | good | good |
| Acid Resistance | | good | good | good | good | good | good |

TABLE 2

| | | Sample No. Present Invention | | | | | |
|---|---|---|---|---|---|---|---|
| | | 7 | 8 | 9 | 10 | 11 | 12 |
| Glass Powder Composition (wt %) | SiO$_2$ | 66.0 | 60.7 | 63.0 | 62.5 | 61.2 | 64.9 |
| | Al$_2$O$_3$ | 4.5 | 4.5 | 6.0 | 5.0 | 5.0 | 6.5 |
| | B$_2$O$_3$ | 16.0 | 14.5 | 18.7 | 17.7 | 19.0 | 18.0 |
| | BaO | 2.5 | 4.0 | 2.9 | 3.0 | 3.0 | 2.5 |
| | Na$_2$O | 7.5 | 13.0 | 6.0 | 8.5 | 8.5 | 5.5 |
| | Li$_2$O | 0.5 | 0.8 | 0.8 | 0.5 | 0.7 | 1.0 |
| | K$_2$O | 2.5 | 2.0 | 2.0 | 2.3 | 2.1 | 1.0 |
| | F$_2$ | 0.5 | 0.5 | 0.6 | 0.5 | 0.5 | 0.6 |
| Mixing Ratio (wt %) | Glass Powder | 95 | 60 | 80 | 70 | 70 | 60 |
| | Yellow Pigment | — | — | — | 8 | 8 | 5 |
| | Brown Pigment | — | — | — | 7 | 7 | 5 |
| | White Pigment | 5 | 40 | 20 | — | 5 | 30 |
| | ZrSiO$_4$ Powder | — | — | — | 5 | 5 | — |
| | ZrO$_2$ Powder | — | — | — | 10 | 5 | — |
| Coefficient of Thermal Expansion of Enamel Coating ($\times 10^{-7}$/°C.) | | 40 | 52 | 51 | 45 | 44 | 41 |
| Cracks | | none | none | none | none | none | none |
| Abrasion Resistance | | good | good | good | good | good | good |
| Acid Resistance | | good | good | good | good | good | good |

TABLE 3

| | | Sample No. Present Invention | | | | | |
|---|---|---|---|---|---|---|---|
| | | 13 | 14 | 15 | 16 | 17 | 18 |
| Glass Powder Composition (wt %) | SiO$_2$ | 63.4 | 64.5 | 61.3 | 64.6 | 60.7 | 61.1 |
| | Al$_2$O$_3$ | 7.0 | 6.1 | 5.2 | 5.6 | 5.6 | 6.5 |
| | B$_2$O$_3$ | 17.0 | 18.4 | 19.2 | 18.0 | 19.2 | 16.7 |
| | BaO | 3.0 | 3.3 | 2.7 | 3.2 | 2.5 | 3.5 |
| | Na$_2$O | 7.6 | 5.6 | 9.1 | 5.4 | 8.5 | 9.0 |
| | Li$_2$O | 0.5 | 1.3 | 0.6 | 0.5 | 1.0 | 1.0 |
| | K$_2$O | 1.3 | 0.7 | 0.8 | 2.0 | 1.6 | 1.8 |
| | F$_2$ | 0.2 | 0.1 | 1.1 | 0.7 | 0.9 | 0.4 |
| Mixing Ratio (wt %) | Glass Powder | 60 | 55 | 50 | 50 | 47 | 60 |
| | Yellow Pigment | 10 | 3 | 5 | 3 | 7 | 13 |
| | Brown Pigment | 10 | 2 | 5 | 2 | 6 | 12 |
| | White Pigment | 5 | 10 | — | 45 | — | — |
| | ZrSiO$_4$ Powder | 10 | 30 | 15 | — | 40 | 5 |
| | ZrO$_2$ Powder | 5 | — | 25 | — | — | 10 |
| Coefficient of Thermal Expansion of Enamel Coating ($\times 10^{-7}$/°C.) | | 51 | 49 | 56 | 34 | 45 | 57 |
| Cracks | | none | none | none | none | none | none |
| Abrasion Resistance | | good | good | good | good | good | good |
| Acid Resistance | | good | good | good | good | good | good |

TABLE 4

| | | Sample No. | | | | | |
|---|---|---|---|---|---|---|---|
| | | Present Invention | | | Comparative Example | | |
| | | 19 | 20 | 21 | 22 | 23 | 24 |
| Glass Powder Composition (wt %) | SiO$_2$ | 65.0 | 60.3 | 62.4 | 65.3 | 69.0 | 60.0 |
| | Al$_2$O$_3$ | 5.6 | 5.9 | 5.0 | 6.2 | 6.0 | 5.0 |
| | B$_2$O$_3$ | 16.0 | 18.2 | 19.1 | 19.5 | 17.0 | 18.2 |
| | BaO | 3.4 | 3.2 | 2.6 | 3.0 | 3.5 | 2.9 |
| | Na$_2$O | 7.7 | 9.6 | 9.2 | 2.5 | 1.5 | 6.0 |
| | Li$_2$O | 0.9 | 0.1 | 1.1 | 0.9 | 0.5 | 0.8 |
| | K$_2$O | 1.1 | 2.1 | 0.4 | 2.0 | 2.0 | 6.5 |
| | F$_2$ | 0.3 | 0.6 | 0.2 | 0.6 | 0.5 | 0.6 |
| Mixing Ratio (wt %) | Glass Powder | 55 | 50 | 47 | 90 | 90 | 90 |
| | Yellow Pigment | 6 | 5 | 9 | — | — | — |
| | Brown Pigment | 6 | 5 | 8 | — | — | — |
| | White Pigment | 25 | — | 30 | 10 | 5 | 10 |
| | ZrSiO$_4$ Powder | 4 | 20 | 6 | — | 5 | — |
| | ZrO$_2$ Powder | 4 | 20 | — | — | — | — |
| Coefficient of Thermal Expansion of Enamel Coating ($\times 10^{-7}$/°C.) | | 39 | 60 | 42 | 47 | 35 | 60 |
| Cracks | | none | none | none | none | none | none |
| Abrasion Resistance | | good | good | good | no good | no good | good |
| Acid Resistance | | good | good | good | good | good | no good |

Each sample in Tables 1-4 was prepared as follows:

A glass batch was prepared to have a composition specified in Tables. The glass batch was melted at a temperature between 1400° and 1500° C. for 10-15 hours, formed into a film shape, and pulverized by a ball mill to obtain glass powder having an average particle size of 5 μm. The glass powder was mixed with a commercially-available coloring pigment, zirconium powder, and zirconia powder to obtain each sample. As the coloring pigment, a combination of a yellow pigment (TiO$_2$—Sb$_2$O$_3$—NiO rutile), a brown pigment (ZnO—Fe$_2$O$_3$—Cr$_2$O$_3$ spinnel), and white pigment (TiO$_2$) was used.

Both of the yellow and the brown pigments were the products supplied by Ferro Enamels (Japan) Limited under the trade name "FERRO COLOR" while the white pigment was the product supplied by Ishihara Sangyo Kaisha, Ltd.

Subsequently, each sample and a vehicle comprising ethyl cellulose dissolved in terpineol were kneaded at a weight ratio of 2:1 to form a paste. The paste was applied by screen printing onto the surface of the low-expansion crystallized glass plate for each of the samples Nos. 1-5 and 10-17 and onto the surface of the low-expansion crystallizable glass plate for each of the samples Nos. 6-9 and 18-24 by screen printing.

Use was made of the low-expansion crystallizable glass plate consisting, by weight, of 66% SiO$_2$, 23% Al$_2$O$_3$, 4% Li$_2$O, 0.5% MgO, 0.3% ZnO, 5% TiO$_2$, 0.2% V$_2$O$_5$, 0.5% Na$_2$O, and 0.5% K$_2$O, and having a size of 50×50×4 mm. The low-expansion crystallized glass plate was obtained by heat-treating the above-mentioned low-expansion crystallizable glass plate to precipitate the solid solution crystals of β-quartz and had the coefficient of thermal expansion of $-3 \times 10^{-7}$/°C. within a temperature range between 30° and 750° C.

Thereafter, the glass plate was subjected to heat treatment at a temperature between 800° and 850° C. to obtain a low-expansion crystallized glass plate coated with an enamel coating in beige. A measured thickness of this enamel coating was 0.5–20 μm.

Then, measurement was made about the coefficient of thermal expansion of the enamel coating formed on the surface of the low-expansion crystallized glass plate. In addition, presence or absence of cracks, the abrasion resistance, and the acid resistance were evaluated. The results are shown in Tables.

As apparent from Tables, the enamel coating using each of the samples Nos. 1–21 according to the present invention had the coefficient of thermal expansion of $34$–$60\times10^{-7}/°C$. within a temperature range between 30° and 380° C. and were excellent in abrasion resistance and acid resistance without occurrence of cracks.

On the other hand, the enamel coatings using the comparative samples Nos. 22 and 23 were low in abrasion resistance and peeled off. The enamel coating using the comparative sample No. 24 was poor in acid resistance.

The coefficient of thermal expansion in Tables was measured in the following manner. Each sample was press-formed into a square bar, and baked at a temperature of 850° C. to form a baked product. The baked product was measured by the use of a differential detection relative dilatometer. The presence of cracks was evaluated by observing the surface of the enamel coating by the use of an optical microscope.

The abrasion resistance was evaluated in the following manner. The surface of the enamel coating was reciprocatingly filed with a sandpaper of #1000/s (100φ) under the load of 3 kg at a one-way speed of 100 mm/s. After 1000 times of reciprocal filing, the change of the enamel coating was visually observed. In Tables, "good" and "no good" represent the absence of any change and the presence of even a slight change, respectively.

The acid resistance was evaluated in the following manner. The crystallized glass plate coated with the enamel coating by using each sample was immersed in a 1% HCl solution held at a temperature of 90° C. for six hours. Thereafter, the appearance of the enamel coating was visually observed. In Tables, "good" and "no good" represent the absence of any change and the presence of even a slight change, respectively.

As described above, the enamel frit composition in the specific example of the present invention does not contain any harmful component such as PbO in the glass powder. In addition, by the use of the enamel frit composition, it is possible to produce the enamel coating excellent in abrasion resistance and acid resistance without occurrence of cracks.

Furthermore, the low-expansion crystallized glass plate in the specific example coated with the enamel coating by using the enamel frit composition is suitable for the top plate of the electric cooker or the electromagnetic cooker because any harmful component is not contained in the enamel coating and the coating hardly peels off.

What is claimed is:

1. An enamel-coated crystallized glass plate comprising:

a crystallized glass plate coated with an enamel coating consisting essentially of 40–98 wt. % glass, 1–55 wt. % coloring pigment, and 0–54% filler;

said glass consisting essentially of, by weight, 55–72% $SiO_2$, 4–8% $Al_2O_3$, 14–22% $B_2O_3$, 2–4% BaO, 5.1–15% $Na_2O$, 0–2% $Li_2O$, 0–2.8% $K_2O$, and 0–2% $F_2$, and said glass plate consisting essentially of, by weight, 60–75% $SiO_2$, 15–25% $Al_2O_3$, 2.5–5% $Li_2O$, 0–3% MgO, 0–3% ZnO, 0–3% BaO, 1–7% $TiO_2$, 0–3% $ZrO_2$, 0–3% $P_2O_5$, 0–2% $Na_2O$, 0–1% $K_2O$, 0–0.5% $V_2O_5$, 0–0.5% $Fe_2O_3$, 0–0.5% NiO, and 0–0.2% CoO, and contains precipitated solid solution crystals of β-quartz.

2. The enamel-coated crystallized glass plate of claim 1, wherein glass plate has a low coefficient of thermal expansion.

3. The enamel-coated crystallized glass plate of claim 2, wherein said coefficient of thermal expansion is $-5$ to $30\times10^{-7}/°C$. from 30° C. to 750° C.

4. The enamel-coated crystallized glass plate of claim 1, wherein said coating has a thermal expansion coefficient of $34$–$60\times10^{-7}/°C$. from 30° C. to 380° C.

5. An enamel coated crystallized glass plate as claimed by claim 1, said glass plate having a low coefficient of thermal expansion and said glass in the enamel coating consists essentaiily of, by weight, 60–65% $SiO_2$, 5–7% $Al_2O_3$, 16–20% $B_2O_3$, 2.5–3.5% BaO, 5.4–10% $Na_2O$, 0.1–1.5% $Li_2O$, 0–2.3% $K_2O$, and 0–1.5% $F_2$.

\* \* \* \* \*